(12) United States Patent
Niskanen

(10) Patent No.: US 9,316,485 B2
(45) Date of Patent: Apr. 19, 2016

(54) APPARATUS COMPRISING A PLURALITY OF INTERFEROMETERS AND METHOD OF CONFIGURING SUCH APPARATUS

(75) Inventor: Antti Niskanen, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 214 days.

(21) Appl. No.: 12/955,230

(22) Filed: Nov. 29, 2010

(65) Prior Publication Data

US 2012/0133949 A1    May 31, 2012

(51) Int. Cl.
    *G01B 9/02* (2006.01)
(52) U.S. Cl.
    CPC ........ *G01B 9/02051* (2013.01); *G01B 9/02027* (2013.01)
(58) Field of Classification Search
    CPC .................... G01B 9/02051; G01B 9/02027
    USPC .......................................... 356/477, 478, 481
    See application file for complete search history.

(56) References Cited

U.S. PATENT DOCUMENTS

| 3,632,214 | A | * | 1/1972 | Chang et al. .................. 356/457 |
| 5,262,842 | A | * | 11/1993 | Gauglitz et al. .............. 356/477 |
| 5,579,108 | A | * | 11/1996 | See ................................. 356/450 |
| 5,680,489 | A | * | 10/1997 | Kersey ............................ 385/12 |
| 5,682,237 | A | * | 10/1997 | Belk .............................. 356/478 |
| 5,721,615 | A | * | 2/1998 | McBride et al. .............. 356/477 |
| 5,777,771 | A | * | 7/1998 | Smith ............................ 398/182 |
| 5,920,392 | A | * | 7/1999 | Tsai et al. ..................... 356/498 |
| 6,211,964 | B1 | * | 4/2001 | Luscombe et al. ............ 356/477 |
| 6,229,633 | B1 | * | 5/2001 | Roberts et al. ................... 398/9 |
| 6,346,985 | B1 | * | 2/2002 | Hall .............................. 356/477 |
| 7,631,378 | B2 | * | 12/2009 | Hironishi et al. ............. 356/477 |
| 2007/0004969 | A1 | | 1/2007 | Kong et al. |
| 2007/0077595 | A1 | * | 4/2007 | Koo et al. ....................... 435/7.1 |
| 2007/0171425 | A1 | * | 7/2007 | De Groot et al. ............. 356/478 |

(Continued)

FOREIGN PATENT DOCUMENTS

| CN | 101324443 A | 12/2008 |
| EP | 2 007 062 A2 | 12/2008 |
| WO | WO 2008/113176 A1 | 9/2008 |

OTHER PUBLICATIONS

Santos, et al., "Providing User Context for Mobile and Social Networking Applications", Pervasive and Mobile Computing 6 (2010), (pp. 324-341).

(Continued)

*Primary Examiner* — Kara E Geisel
*Assistant Examiner* — Hina F Ayub
(74) *Attorney, Agent, or Firm* — Harrington & Smith

(57) ABSTRACT

Embodiments of the invention relate to an apparatus and methods of using the apparatus wherein the apparatus includes a plurality of interferometers wherein the plurality of interferometers enable interference of an electromagnetic input signal, wherein the plurality of interferometers are configured to receive a plurality of sensor input signals from a plurality of sensors where the plurality of sensor input signals provide an indication of a plurality of sensed characteristics and the sensor input signals control the interference of the electromagnetic input signal by the plurality of interferometers, and wherein the plurality of interferometers are configured to provide a first output when the plurality of characteristics sensed by the sensors correspond to a first context and a second output when the plurality of characteristics sensed by the sensors correspond to a second context.

20 Claims, 5 Drawing Sheets

(56) References Cited

U.S. PATENT DOCUMENTS

| | | | |
|---|---|---|---|
| 2007/0173799 A1* | 7/2007 | Hsia | 606/27 |
| 2007/0177151 A1* | 8/2007 | Isomura et al. | 356/477 |
| 2009/0079547 A1 | 3/2009 | Oksanen et al. | |
| 2009/0174885 A1* | 7/2009 | Li | 356/451 |
| 2009/0237765 A1* | 9/2009 | Lippert et al. | 359/213.1 |
| 2011/0040497 A1* | 2/2011 | Olesen | 702/34 |

OTHER PUBLICATIONS

Gang Peng et al, "Diagnosing Lung Cancer in Exhaled Breath Using Gold Nanoparticles", (2009) (pp. 669-673).

Alberto Politi et al, "Silica-on-Silicon Waveguide Quantum Circuits", (2008), (pp. 645-649).

Dominic W Berry and Howard M Wiseman, "Quantum physics on a chip", (2009), (pp. 317-319).

\* cited by examiner

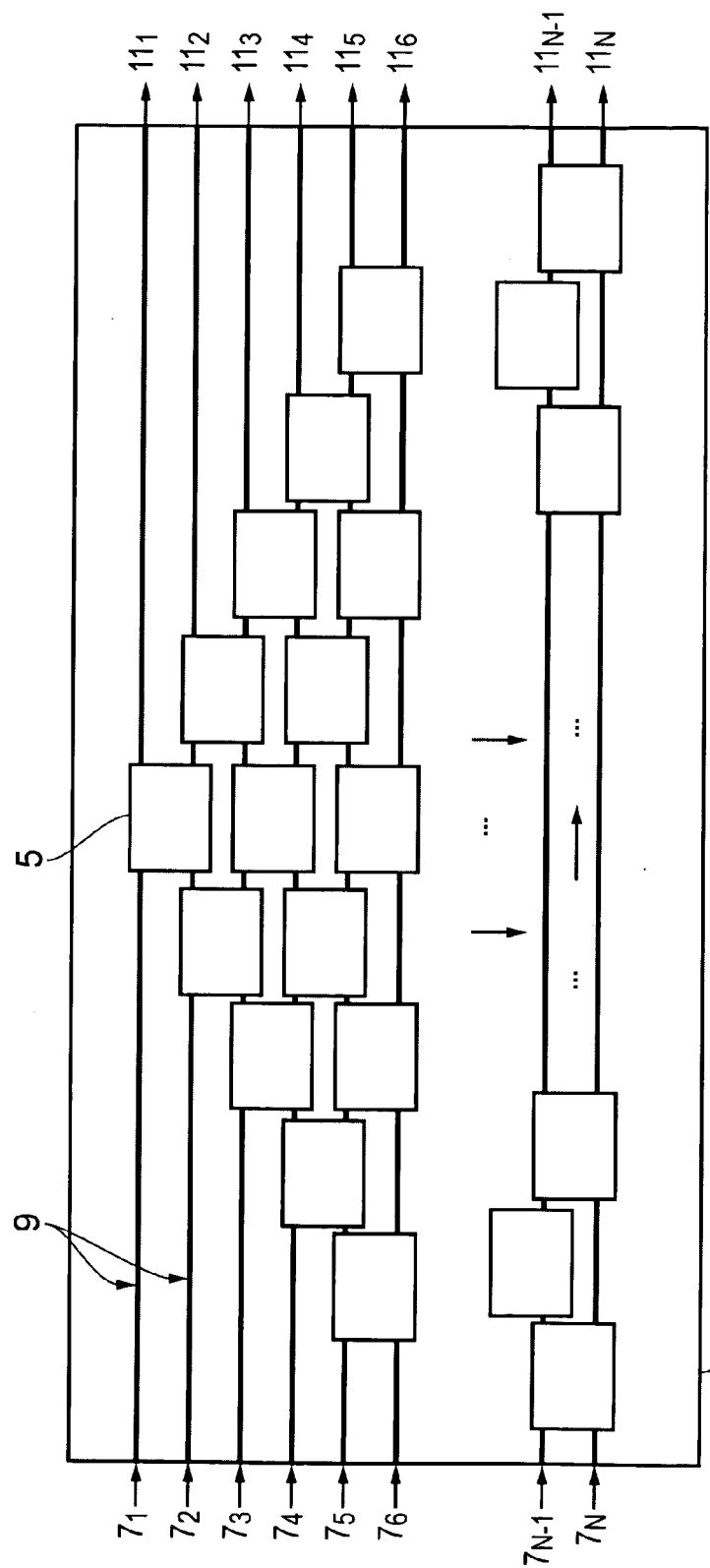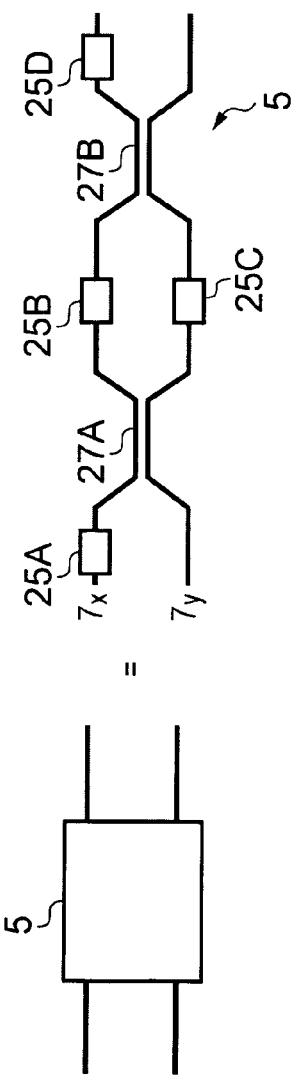
FIG. 2A
FIG. 2B

APPARATUS COMPRISING A PLURALITY OF INTERFEROMETERS AND METHOD OF CONFIGURING SUCH APPARATUS

TECHNOLOGICAL FIELD

Embodiments of the present invention relate to an apparatus and method. In particular, they relate to an apparatus and method which enables the outputs of a plurality of sensors to be characterized to give an indication of a detected context.

BACKGROUND

Sensors which can measure or detect physical characteristics are known. Often it can be useful to combine the outputs of a plurality of sensors. For example, a user may wish to determine something which requires more than one sensor output. For example they may wish to determine the context of an apparatus. The context of an apparatus may be the physical conditions of the apparatus or a user of the apparatus. For example, the context could be the location of the apparatus, such as whether or not the apparatus is inside or outside or it could be a condition of a user, for example whether or not a disease is present.

BRIEF SUMMARY

According to various, but not necessarily all, embodiments of the invention there is provided an apparatus comprising: a plurality of interferometers wherein the plurality of interferometers enable interference of an electromagnetic input signal, wherein the plurality of interferometers are configured to receive a plurality of sensor input signals from a plurality of sensors where the plurality of sensor input signals provide an indication of a plurality of sensed characteristics and the sensor input signals control the interference of the electromagnetic input signal by the plurality of interferometers, and wherein the plurality of interferometers are configured to provide a first output signal when the plurality of characteristics sensed by the sensors correspond to a first context and a second output signal when the plurality of characteristics sensed by the sensors correspond to a second context.

In some embodiments of the invention the plurality of interferometers may be provided on a single chip.

In some embodiments of the invention the sensor input signals may control the interference of the electromagnetic input signal by the plurality of interferometers by introducing a phase shift into one or more of the plurality of interferometers.

In some embodiments of the invention the sensor input signals may control the interference of the electromagnetic input signal by the plurality of interferometers by controlling the coupling between two or more of the plurality of interferometers.

In some embodiments of the invention each of the plurality of sensors may be configured to sense a different characteristic.

In some embodiments of the invention the electromagnetic input signal may comprise a plurality of coherent components.

In some embodiments of the invention the output signal may comprise a plurality of components and in the first output signal a first component may have the largest power level and in the second output signal a second, different component may have the largest power level.

In some embodiments of the invention the electromagnetic input signal may comprise radiation with a wavelength between 100 nm and 2500 nm.

In some embodiments of the invention the electromagnetic input signal may be provided by a laser.

In some embodiments of the invention the components of the electromagnetic input signal may be selected so that the first output is provided when the plurality of characteristics sensed by the sensors correspond to a first context and the second output is provided when the plurality of characteristics sensed by the sensors correspond to a second context.

In some embodiments of the invention the apparatus may also be configured to receive one or more control inputs where the control inputs control the interference of the electromagnetic input signal by at least some of the plurality of interferometers.

In some embodiments of the invention the control inputs may be configured so that the first output is provided when the plurality of characteristics sensed by the sensors correspond to a first context and the second output is provided when the plurality of characteristics sensed by the sensors correspond to a second context.

In some embodiments of the invention the plurality of interferometers may be modeled as an N×N matrix, where N is the number of components in the electromagnetic input signal and where the values of the elements in the matrix are given by the interference of the electromagnetic input signal caused by the plurality of interferometers. In some embodiments of the invention the values of the components of the electromagnetic input signal may be selected to correspond to a combination of two different rows of the matrix.

According to various, but not necessarily all, embodiments of the invention there is provided a method: comprising configuring a plurality of interferometers to receive a plurality of sensor input signals from a plurality of sensors where the plurality of sensor input signals provide an indication of a plurality of sensed characteristics and the plurality of sensor input signals control the interference of the electromagnetic input signal by the plurality of interferometers, and configuring the plurality of interferometers to provide a first output signal when the plurality of characteristics sensed by the plurality of sensors correspond to a first context and a second output signal when the plurality of characteristics sensed by the plurality of sensors correspond to a second context.

In some embodiments of the invention the plurality of interferometers may be provided on a single chip.

In some embodiments of the invention the sensor input signals may control the interference of the electromagnetic input signal by the plurality of interferometers by introducing a phase shift into one or more of the plurality of interferometers.

In some embodiments of the invention the sensor input signals may control the interference of the electromagnetic input signal by the plurality of interferometers by controlling the coupling between two or more of the plurality of interferometers.

In some embodiments of the invention each of the plurality of sensors may be configured to sense a different characteristic.

In some embodiments of the invention the electromagnetic input signal may comprise a plurality of coherent components.

In some embodiments of the invention the output signal may comprise a plurality of components and in the first output signal a first component has the largest power level and in the second output signal a second, different component has the largest power level.

In some embodiments of the invention the electromagnetic input signal may comprise radiation with a wavelength between 100 nm and 2500 nm.

In some embodiments of the invention the electromagnetic input signal may be provided by a laser.

In some embodiments of the invention the method may further comprise selecting the electromagnetic input signal so that the first output signal is provided when the plurality of characteristics sensed by the sensors correspond to a first context and the second output signal is provided when the plurality of characteristics sensed by the sensors correspond to a second context.

In some embodiments of the invention the method may further comprise configuring the apparatus to receive one or more control inputs where the control inputs control the interference of the electromagnetic input signal by at least some of the plurality of interferometers.

In some embodiments of the invention the method may further comprise controlling the control inputs so that the first output is provided when the plurality of characteristics sensed by the sensors correspond to a first context and the second output is provided when the plurality of characteristics sensed by the sensors correspond to a second context.

In some embodiments of the invention the plurality of interferometers may be modeled as an N×N matrix, where N is the number of components in the electromagnetic input signal and where the values of the elements in the matrix are given by the interference of the electromagnetic input signal caused by the plurality of interferometers. The components of the electromagnetic input signal may be selected to correspond to a combination of two different rows of the matrix.

In some embodiments of the invention configuring the interferometers to provide the first output signal and the second output signal may comprise an iterative calibration procedure. The iterative calibration procedure may comprise selecting a first output signal to correspond to a first context and selecting a second output signal to correspond to a second context and providing known inputs by the plurality of sensors and varying the components of the electromagnetic input signal to find an electromagnetic input signal which provides the selected outputs for the respective contexts.

According to various, but not necessarily all, embodiments of the invention there is provided a computer program comprising computer program instructions that, when executed by at least one processor, enable: configuring a plurality of interferometers to receive a plurality of sensor input signals from a plurality of sensors where the plurality of sensor input signals provide an indication of a plurality of sensed characteristics and the plurality of sensor input signals control the interference of the electromagnetic input signal by the plurality of interferometers; and configuring the plurality of interferometers to provide a first output signal when the plurality of characteristics sensed by the plurality of sensors correspond to a first context and a second output signal when the plurality of characteristics sensed by the plurality of sensors correspond to a second context.

In some embodiments of the invention the computer program may comprise program instructions for causing a computer to perform the method of any of the above paragraphs.

In some embodiments of the invention there may be provided a physical entity embodying the computer program as described above.

In some embodiments of the invention there may be provided an electromagnetic carrier signal carrying the computer program as described above.

The apparatus may be for determining a context of the apparatus or user of the apparatus.

BRIEF DESCRIPTION

For a better understanding of various examples of embodiments of the present invention reference will now be made by way of example only to the accompanying drawings in which:

FIG. 1 schematically illustrates an apparatus according to embodiments of the invention;

FIG. 2A illustrates an apparatus 1, according to embodiments of the invention, in more detail;

FIG. 2B schematically illustrates an interferometer which may be used in some embodiments of the invention;

DETAILED DESCRIPTION

Figure 1:
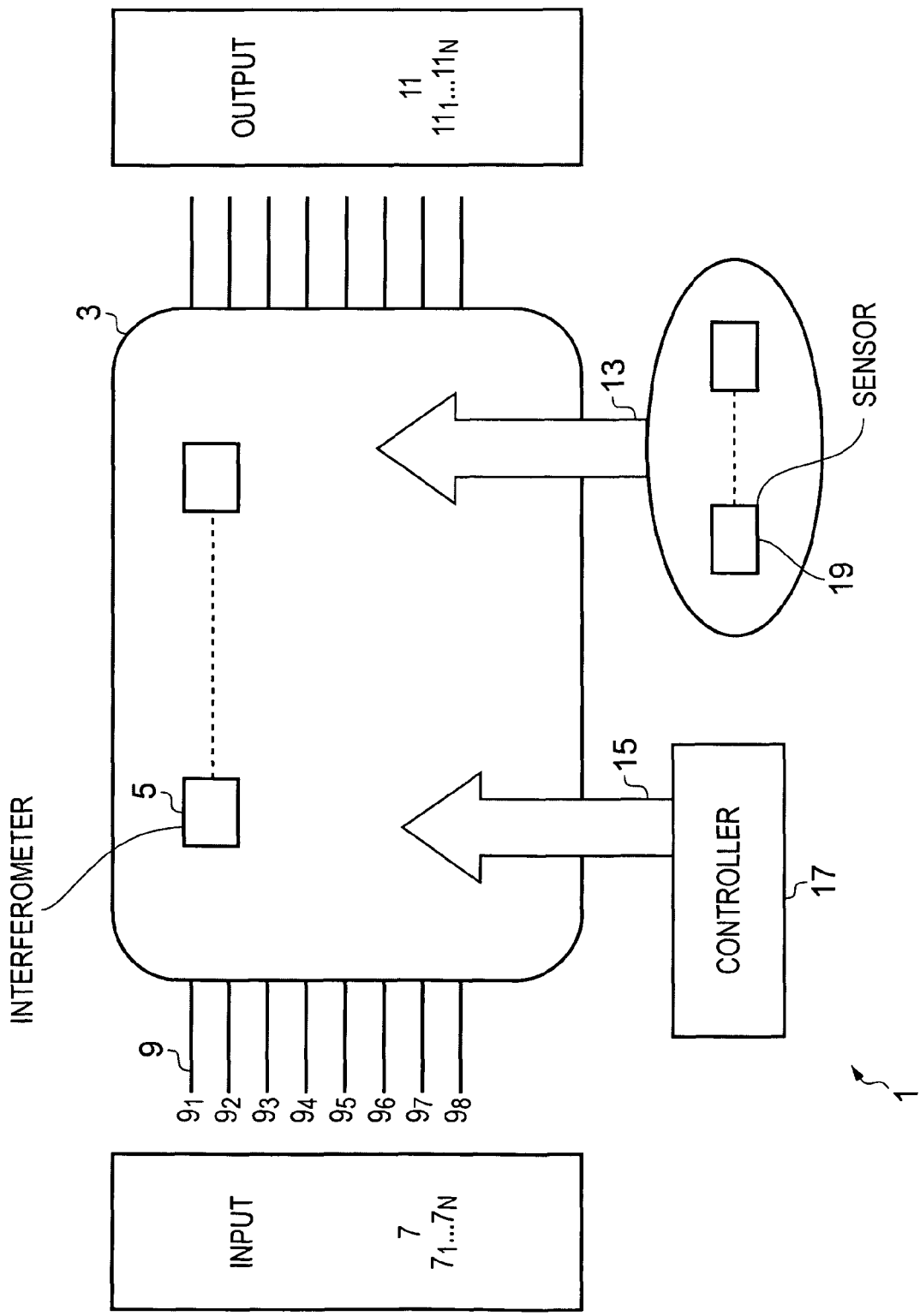

The Figures illustrate an apparatus 1 and methods of using the apparatus 1 wherein the apparatus 1 comprises: a plurality of interferometers 5 wherein the plurality of interferometers 5 enable interference of an electromagnetic input signal 7, wherein the plurality of interferometers 5 are configured to receive a plurality of sensor input signals 13 from a plurality of sensors 19 where the plurality of sensor input signals 13 provide an indication of a plurality of sensed characteristics and the sensor input signals 13 control the interference of the electromagnetic input signal 7 by the plurality of interferometers 5, and wherein the plurality of interferometers 5 are configured to provide a first output signal 11 when the plurality of characteristics sensed by the sensors 19 correspond to a first context and a second output signal 11 when the plurality of characteristics sensed by the sensors 19 correspond to a second context.

In the following description, unless expressly stated otherwise, the words "connect" and "couple" and their derivatives mean operationally connected or operationally coupled. It is to be appreciated that any number or combination of intervening components can exist including no intervening components.

FIG. 1 schematically illustrates an apparatus 1 according to embodiments of the invention. As described below the apparatus 1 is configured to enable the output of a plurality of sensors 19 to be combined to provide a characteristic output. The characteristic output may be one of a set of predetermined characteristic outputs. The characteristic output may be indicative of a particular context.

The context may provide an indication of a physical condition. It could be any of a wide range of conditions, for example, it could be the location of the apparatus, whether it is inside or outside. In other embodiments of the invention it could be the physical conditions of a user for example, the context could be whether or not a disease such as cancer is present. The physical characteristics which are measured by the sensors will depend on the purpose of the apparatus and the context it is to be used to determine.

In the exemplary embodiment illustrated in FIG. 1 the apparatus 1 comprises a plurality of interferometers 5 which are configured to receive an electromagnetic input signal 7 and provide an output signal 11. The output signal 11 depends upon the outputs of a plurality of sensors 19 which are coupled to the apparatus 1.

The electromagnetic input signal 7 may comprise any type of electromagnetic radiation. In some embodiments of the invention the electromagnetic input signal 7 may comprise ultra violet light, visible light or infra red radiation. The electromagnetic input signal 7 may have a wavelength of between 100 and 2500 nm. In some embodiments of the invention the wavelength of the electromagnetic input signal 7 may be about 1550 nm.

The electromagnetic input signal 7 may be provided by any source of coherent electromagnetic signals. For example, the electromagnetic input signal 7 may be provided by a laser or single photon input.

In the illustrated embodiment the electromagnetic input signal 7 comprises a plurality of coherent components $7_1$ to $7_N$ so that N independent electromagnetic input signal 7 components are provided to the apparatus 1. In such embodiments the electromagnetic input signal 7 may be represented by the vector a where the vector a comprises N elements and the value of each element corresponds to one of the components $7_1$ to $7_N$ of the electromagnetic input signal 7.

In some embodiments of the invention each of the N components $7_1$ to $7_N$ of the electromagnetic inputs signal 7 may have the same wavelength. In other embodiments of the invention some of the components $7_1$ to $7_N$ of the electromagnetic inputs signal 7 may have a different wavelength to other components. In such embodiments of the invention the components of the electromagnetic inputs signal 7 which have different wavelengths may remain separated within the apparatus 1. This may enable the apparatus 1 to be used to provide a larger number of possible characteristic outputs and may enable a larger number of different contexts to be detected.

The N independent components $7_1$ to $7_N$ of the electromagnetic input signal 7 are provided to the apparatus 1 via N waveguides $9_1$ to $9_N$. The waveguides 9 couple the plurality of interferometers 5 together and enable the input signal to be transmitted between the plurality of waveguides 9.

The waveguides $9_1$ to $9_N$ may comprise any means which enables the electromagnetic input signal 7 to be guided between the plurality of interferometers 5 to the output. In some embodiments of the invention the waveguides $9_1$ to $9_N$ may be lossless so that there is no attenuation of the electromagnetic input signal 7 as it is transmitted through the apparatus 1.

The waveguides 9 couple the plurality of interferometers 5 to each other. The plurality of interferometers 5 may comprise any means which enables mixing of the components $7_1$ to $7_N$ of the electromagnetic input signal 7. At least some of the plurality of interferometers 5 may be tuneable so that the amount of mixing may be controlled by control input signals 15 and/or sensor input signals 13. The amount of interference introduced by each interferometer 5 may be controlled by controlling a phase shift within an interferometer 5 or by varying the coupling between the interferometers. The mixing may comprise enabling constructive or destructive interference of different components $7_1$ to $7_N$ of the electromagnetic input signal 7. This causes a variation in the power output of the components of the output signal 11.

In some embodiments of the invention the plurality of interferometers 5 may comprise Mach-Zehnder interferometers. In other embodiments of the invention other types of interferometers may be used.

The apparatus 1 may comprise any number of interferometers 5. In the illustrated embodiment $$N \times \frac{(N-1)}{2}$$

interferometers are provided where N is the number of components $7_1$ to $7_N$ of the electromagnetic input signal 7 which are provided to the apparatus 1.

In some embodiments of the invention the plurality of interferometers 5 may be provided on a single chip 3. An interferometer chip 3 according to embodiments of the invention is illustrated in more detail in FIG. 2A. An exemplary embodiment of an interferometer 5 which may be provided on the chip 3 is illustrated in more detail in FIG. 2B.

The plurality of interferometers 5 may be lossless so that there is no attenuation of the input electromagnetic signal 7 as it passes through the plurality of interferometers 5. This enables the plurality of interferometers 5 to be represented as a matrix U. In embodiments of the invention where there are N waveguides the matrix will be an N×N matrix and each of the elements $u_{i,j}$ in the matrix U represents the amount of interference introduced by one of the interferometers 5 either by a phase shift or by the coupling to the adjacent interferometers. As the amount of interference introduced may be controlled by the sensor input 13 the matrix U may provide a representation of the characteristics detected or measured by the plurality of sensors 19.

The apparatus 1 is configured to be coupled to a plurality of sensors 19. The sensors 19 may comprise any means for detecting or measuring a physical characteristic and providing an output signal such that the output signal 13 is dependent upon the measured or detected characteristic. The number of sensors 19 which may be coupled to the apparatus 1 may depend upon the number of characteristics which are to be measured and the number of interferometers 5 within the apparatus 1. The number of sensors 19 may be less than or equal to the total number of phase shift elements 25 within the interferometers 5 in the apparatus 1.

In some embodiments of the invention each of the plurality of sensors 19 may be independent from the other sensors so that the output of one sensor 19 is not influenced by the output of other sensors 19.

Each sensor detects or provides a measurement of a particular characteristic. A characteristic may comprise any physical variable which may be sensed or measured by a sensor 19. The characteristics may be used to determine the context of the apparatus 1. A single characteristic may be insufficient to enable the context of the apparatus 1 to be determined without the use of other characteristics. However, any number of characteristics may be combined to enable the context to be determined.

In some embodiments of the invention each of the characteristics may be independent of each other so that one measured or sensed characteristic is not influenced by another measured or sensed characteristic. In other embodiments of the invention some of the characteristics may be related so that there may be some correlation between the values of some of the measure characteristics.

The characteristics sensed by the sensors will depend upon the purpose of the apparatus 1 and the different contexts which it is trying to detect. In some embodiments of the invention the characteristics may include the presence of a particular chemical, temperature, atmospheric conditions, pressure, noise, vibrations or any other physical variable.

When the apparatus 1 is in use each sensor 19 provides a sensor input signal 13 to the apparatus 1 indicative of the measured or detected characteristic. The sensor input signal 13 is used to control the amount of interference introduced by an interferometer 5 within the apparatus 1.

In some embodiments of the invention the apparatus 1 may also be configured to be coupled to a controller 17. The controller 17 may be which is configured to provide one or more control inputs 15 to the plurality of interferometers 5. The control inputs 15 may be used to control the amount of interference introduced by any given interferometer 5. This control inputs 15 may used to calibrate the apparatus 1 to ensure that the correct output signals 11 are given for the correct contexts.

The output signal 11 which is provided by the apparatus 1 is dependent upon the sensor input signals 13. As the sensor input signals are dependent upon the characteristics which are sensed or measured by the plurality of sensors 19 the output signal 11 provides an indication of the various characteristics and so provides an indication of the context of the apparatus 1.

In the illustrated embodiment the electromagnetic input signal 7 comprises N components $7_1$ to $7_N$ and so the output signal 11 also comprises N components $11_1$ to $11_N$. In such embodiments the output signal 11 may be represented by the vector b where the vector b comprises N elements and each element corresponds to one of the components $11_1$ to $11_N$ of the output signal 11. In such embodiments of the invention the values of the components of the output signal b may given by b=Ua. Where a is the vector representing the input signal and U is the matrix representing the interference introduced by the plurality of interferometers 5.

Figure 3:
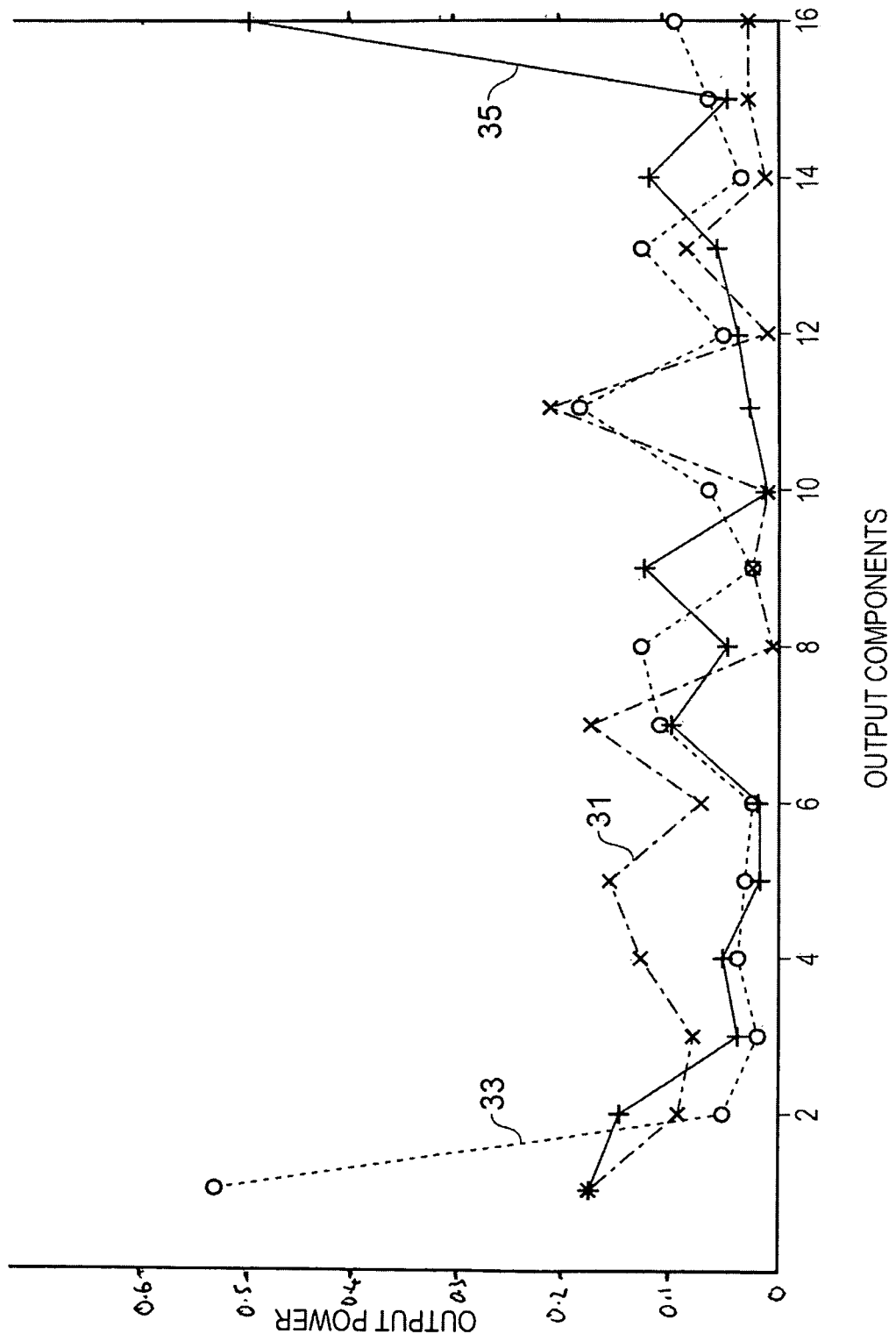
FIG. 3 is a plot illustrating the power level of components of an output signal provided by the apparatus according to embodiments of the invention.

The apparatus 1 may be configured so that when the characteristics detected by the plurality of sensors 19 correspond to a first context a first component $11_i$ of the output signal 11 has a much greater power level than all of the other components of the output signal 11. Similarly when the characteristics detected by the plurality of sensors 19 correspond to a second, different context a second, different component $11_j$ of the output signal 11 has a much greater power level than all of the other components of the output signal 11. This enables a user of the apparatus 1 to easily determine the context of the apparatus 1 because they can easily see whether or not one of the components of the output signal 11 has a significantly higher power level than the other components. FIG. 3 is a plot of the power level for each of the components of an output signal 11 according to an embodiment of the invention.

FIG. 2A illustrates an apparatus 1, according to embodiments of the invention, in more detail. As described above, in relation to FIG. 1, the apparatus 1 comprises a chip 3 and a plurality of interferometers 5 mounted on the chip 3. The plurality of interferometers 5 are coupled together via a plurality of waveguides 9.

The chip 3 illustrated in FIG. 2A comprises N waveguides $9_1$ to $9_N$ and $$N \times \frac{(N-1)}{2}$$

interferometers 5. For the purposes of clarity only a portion of the waveguides 9 and interferometers 5 are illustrated. The ellipses and arrows indicate that other waveguides 9 and interferometers 5 may be included on the chip 3. It is to be appreciated that N could be any positive integer.

It is to be appreciated that the arrangement of the interferometers 5 and the waveguides 5 illustrated in FIG. 2A is merely an exemplary embodiment and that any suitable arrangement may be used.

Each of the waveguides $9_1$ to $9_N$ is provided with a different component $7_1$ to $7_N$ of the electromagnetic input signal 7. The waveguides $9_1$ to $9_N$ then guide the electromagnetic input signal 7 to the plurality of interferometers 5. Once the electromagnetic input signal 7 has passed through the plurality of interferometers 5 the output signal 11 is provided by the apparatus 1.

Each of the interferometers 5 is indicated in FIG. 2A by a rectangular box. The interferometer 5 may comprise any means which enables mixing of the components of the input signal 7. The interferometers 5 may be tuneable to enable the amount of mixing to be controlled. The amount of mixing may be controlled by a control input 15 from a controller 17 or by a sensor input 13 from one or more sensors 19. FIG. 2B schematically illustrates an interferometer 5 which may be used in some embodiments of the invention.

The exemplary interferometer 5 in FIG. 2B comprises a plurality of phase shift elements 25 and a plurality of beam splitting elements 27. The phase shift element 25 may comprise any means which introduces a phase shift into the electromagnetic signal as it passes through the interferometer 5. Some of the phase shift elements 25 may be controllable so that the amount of phase shift introduced by the phase shift element 25 can be varied in response to an input signal. the input signal may be a control input signal 15 provided by a controller 17 or a sensor input signal 13 provided by one of the plurality of sensors 19.

The beam splitting elements 27 may comprise any means which splits the electromagnetic signals. The beam splitting elements 27 may comprise a 50/50 beam splitter so that the signals are split into two equal components as they pass through the beam splitter.

The exemplary interferometer 5 illustrated in FIG. 2B comprises two waveguides $9_x$ and $9_y$ which are provided with two components $7_x$ and $7_y$ of the electromagnetic input signal 7. The waveguides $9_x$ and $9_y$ may be any of the wave guides $9_1$ to $9_N$ illustrated in FIG. 2A.

A first phase shift element 25A introduces a first phase shift into the first component $7_x$ of the electromagnetic input signal 7 so that there is a phase difference between the first component $7_x$ and the second component $7_y$. The electromagnetic signals are then provided to a beam splitting element 27A where the two components are mixed before being split into two components. As the two components of the signal are not in phase there will be some interference of the signals at the beam splitting element 27A as they are mixed. This may be constructive or destructive interference depending on the phase shift that was introduced by the phase shift element 25A.

A first component of the split signal is provided to a second phase shift element 25B and the second component of the phase shift element is provided to a third phase shift element 25C. The phase shift elements 25B and 25C introduce further phase shifts into the respective components of the signal and so adjusts the phase difference between the respective components of the signal.

The phase shifted components are then provided to a second beam splitting element 27B where the two components are then mixed and split into two other components. A first one of the components is provided to a fourth phase shift element 25D.

The output of the interferometer 5 illustrated in FIG. 2B may be provided as the output of the apparatus 1 or it may be provided to a further interferometer 5 where a similar process will be carried out.

FIG. 3 is a plot illustrating the power level of components $11_1$ to $11_N$ of an output signal 11 provided by the apparatus 1 according to embodiments of the invention.

In the plot the output signals 11 comprise 16 components $11_1$ to $11_{16}$ so the input signal 7 also comprises 16 components $7_1$ to $7_{16}$ and the apparatus 1 may comprise $$16 \times \frac{(16-1)}{2}$$

interferometers.

The plot illustrated in FIG. 3 illustrates the output signal 11 provided in three different situations. In the first situation the apparatus 1 is not in either a first context or a second context, in the second situation the apparatus 1 is in a first context and in the third situation the apparatus 1 is in the second context.

The dashed line 31 indicates the output signal 11 which is provided in the first situation when the apparatus 1 is not in either a first context or a second context. In such a situation none of the individual components $11_1$ to $11_{16}$ of the output signal 11 have a significantly higher power level than any of the other components $11_1$ to $11_{16}$ of the output signal 11. All of the components $11_1$ to $11_{16}$ of the output signal 11 have a similar power level. It may be difficult for a user of the apparatus 1 to distinguish any one of the components $11_1$ to $11_{16}$ of the outputs signal 11 from any of the other components $11_1$ to $11_{16}$ of the output signal 11.

The dotted line 33 corresponds to the second situation where the apparatus 1 is in a first context. In this situation the plurality of sensors 19 have provided sensor input signals 13 which act to control the interference of the electromagnetic input signals 7 within the apparatus 5 so that most of the power of the output signal 11 is output by the first component $11_1$. This makes it easy for a user of the apparatus 1 to distinguish the first output component $11_1$ from all of the other output components $11_2$ to $11_{16}$ as it has a significantly higher power level. This enables a user of the apparatus 1 to easily determine that the context of the apparatus 1 is the first context.

The solid line 35 corresponds to the third situation where the apparatus 1 is in a second context. In this situation the plurality of sensors 19 have provided sensor input signals 13 which act to control the interference of the electromagnetic input signals 7 within the apparatus 5 so that most of the power of the output signal 11 is output by the sixteenth output component $11_{16}$. As with the second situation, it is easy for a user to distinguish the sixteenth output component $11_{16}$ from all of the other output components $11_1$ to $11_{15}$ as it has a significantly higher power level.

It is also easy for a user to distinguish the first situation from the second situation because the high power levels are given by different components $11_1$ to $11_{16}$ of the output signal 11. A user may be able to easily determine between the different components $11_1$ to $11_{16}$ of the output signal 11.

Figure 4:
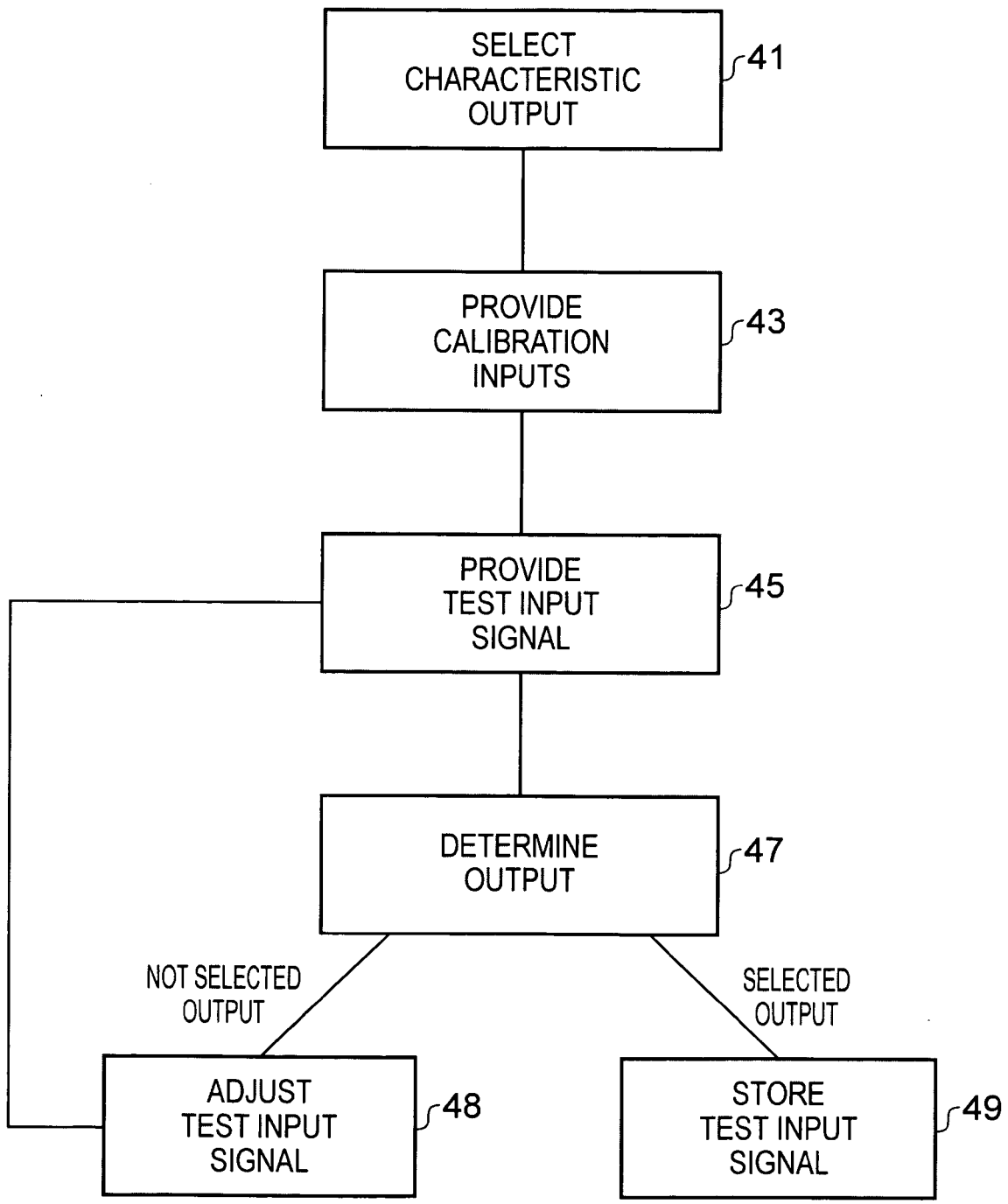
FIG. 4 is a block diagram of a method of calibrating an apparatus according to embodiments of the invention.

FIG. 4 is a flow chart which illustrates a method of configuring an apparatus 1 according to embodiments of the invention.

At block 41 a user of the apparatus 1 selects a characteristic output for each context that they wish to determine. Each characteristic output may have one component $11_1$ to $11_N$ of the output signal 11 having a significantly higher power level than the other components, as illustrated in FIG. 3. It is to be appreciated that other types of characteristic outputs could also be used. A different characteristic output may be selected for each different context.

In the following example, only two contexts are used but it is to be appreciated that any number of contexts may be detected depending on the number of components of the input signal 7, the number of interferometers 5, the number of sensors available and the intended purpose of the apparatus 1.

At block 43 the apparatus 1 is provided with calibration inputs. The calibration inputs may comprise known control inputs 15 from the controller 17 and known sensor inputs 13 which are known to correspond to one of the predetermined contexts.

At block 45 an input signal 7 is provided to the apparatus 1. The input signal 7 may be a test signal. At block 47 the outputs signal 11 is determined. If the output signal 11 does not correspond to the characteristic output which has been selected for the given context then, at block 48 the test input signal 7 is adjusted. The process then returns to block 45 and blocks 45 and 47 are repeated with the adjusted test input signal 7.

If, at block 47, it is determined that the output signal 11 does correspond to the selected characteristic output then, at block 49 the test output signal 7 which was used is stored in a memory so that it can be used during normal use of the apparatus 1.

The process illustrated in FIG. 4 may be repeated for each context of the apparatus 1. The process may be used to find a test signal which can provide the selected characteristic outputs for a plurality of different contexts.

In the embodiment illustrated in FIG. 4 the test input signal is adjusted in each of the iterations of the calibration. In other embodiments of the invention the control signals 15 provided by the controller 17 may be adjusted instead of or in addition to the adjustment of the input signal.

FIG. 4 illustrates a method in which a suitable input signal 7 is determined using an iterative calibration procedure. It is to be appreciated that other methods of calibrating the apparatus 1 may be used in other embodiments of the invention. For example, in some embodiments of the invention a suitable input signal may be calculated from the rows of the matrix U represents the interference introduced by the plurality of sensors 19 and the controller 17.

As mentioned above the output signal b may be given by b=Ua. The matrix U will be different for each context so $U_1$ represents the matrix for a first context and $U_2$ represents the matrix for a second context. The input signal may be selected to be a linear combination of the complex conjugate of two different rows of $U_1$ and $U_2$ such that a=c*+d* where c represents a row of the matrix $U_1$ and d represents a row of the matrix $U_2$.

This gives the output signal as b=U(c*+d*).

If the matrix U is large enough then it is probable that any given rows of the matrix will have some orthogonal components so that when the sensor input signals 13 correspond to the first context the output signal 11 is given by $$b = U_1(c^* + d^*) \approx U_1 c^*$$

If, for example, c was row 1 of the matrix $U_1$ then $$U_1 c^* = [1\ 0\ \ldots\ 0\ 0]^T$$

This ensures that most of the power of the output signal 11 is given by the first component.

Similarly, for the second context where $U=U_2$ then, if row d is the Nth row of matrix $U_2$, then when the outputs of the sensor correspond to the second context the output signal is given by $$b = U_2(c^* + d^*) \approx U_2 d^* = [0\ 0\ \ldots\ 0\ 1]^T$$

and most of the power of the output signal 11 is given by the Nth component.

In some embodiments of the invention the calibration of the apparatus 1 may be carried out by a computer program.

Figure 5:
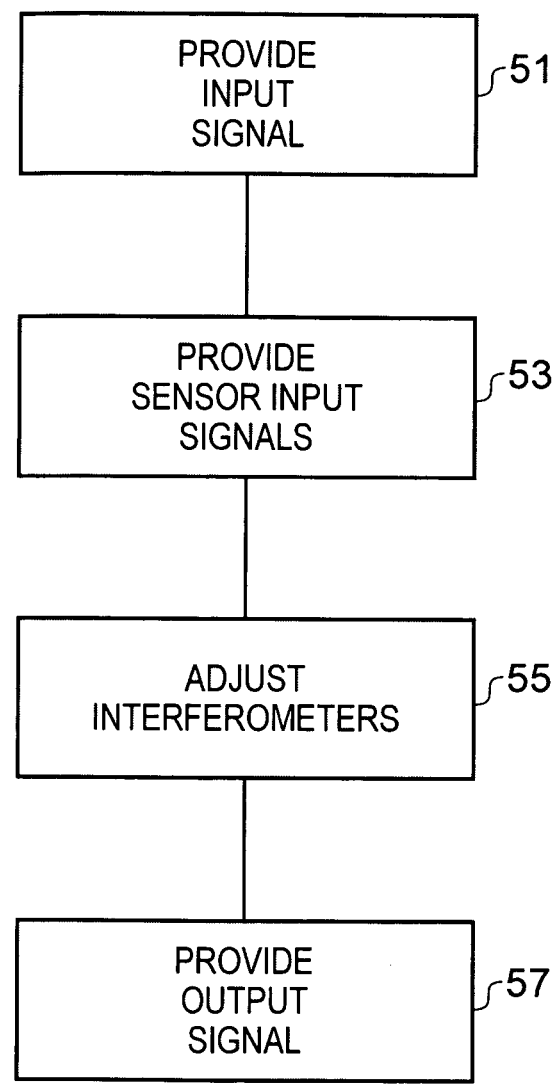
FIG. 5 is a block diagram of a method of using the apparatus according to embodiments of the invention.

FIG. 5 illustrates a method of using the apparatus 1 according to an embodiment of the invention.

At block 51 the apparatus 1 is provided with an input signal 7. The input signal 7 may be determined in accordance with any of the methods described above.

At block 53 the apparatus 1 is provided with the sensor input signals 13 from the plurality of sensors 19. The apparatus 1 may also be provided with control input signals 15 from the controller 17. In response to the signals provided at block 53 the interference values of the plurality of interferometers 5 are adjusted at block 55.

At block 57 the output signal 11 is provided. If the sensor input signals 13 provided by the plurality of sensors 19 correspond to a first context then the characteristic input which has been selected to indicate the first context will be provided. If the sensor output signals 13 provided by the plurality of sensors 19 correspond to a second context then the characteristic output which has been selected to indicate the second context will be provided.

Embodiments of the invention provide a simple apparatus which may be used to quickly determine a context of the apparatus 1 or a user of the apparatus 1. The apparatus 1 may be configured to receive a large number of sensor inputs 13 which might comprise a large amount of data. The apparatus 1 enables all of the data to be manipulated into one single output which is easy for user to understand. This means that the user does not have to analyse all of the data themselves to determine the context.

The outputs which are provided by the apparatus 1 may be easy for a user to distinguish. In exemplary embodiments of the invention the outputs correspond to different levels of light being transmitted out of different waveguides. This may something which is easy for a user to determine.

The apparatus 1 may be configured to work any number or type of sensors 19 and determine any number or type of contexts. By selecting appropriate input signals and control inputs 15 the same apparatus may also be configured to detect a plurality of unrelated contexts.

The apparatus 1 is programmable so that it can be configured and reconfigured to work with different contexts. As the apparatus 1 is programmable this also enables the user to change the sensors 19 which are coupled to the apparatus 1. In some embodiments of the invention, this may enable the user to change the purpose of the apparatus 1 by enabling it to detect different or additional contexts.

The apparatus 1 is low power and may be integrated onto a single chip 3. The blocks illustrated in the FIGS. 4 and 5 may represent steps in a method and/or sections of code in a computer program. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
   a plurality of interferometers wherein the plurality of interferometers enable interference of an electromagnetic input signal, and the plurality of interferometers is provided on a single chip; and
   a plurality of sensors configured to provide a plurality of sensor output signals to the plurality of interferometers to control the interference of the electromagnetic input signal by the plurality of interferometers, wherein different sensors within the plurality of sensors are configured to sense different types of characteristics such that the plurality of sensor output signals provide an indication of a plurality of different types of sensed characteristics,
   wherein the plurality of interferometers are configured to receive the electromagnetic input signal and receive the plurality of sensor output signals from the plurality of sensors to enable the sensor output signals to control the interference of the electromagnetic input signal by the plurality of interferometers, and
   wherein the plurality of interferometers are configured to provide a first output signal when the plurality of different types of characteristics sensed by the sensors correspond to a first context and a second output signal when the plurality of different types of characteristics sensed by the sensors correspond to a second context.

2. An apparatus as claimed in claim 1 wherein the apparatus comprises a plurality of phase shift elements configured to provide a phase shift in the electromagnetic input signal and to vary the phase shift in response to the sensor output signals to control the interference of the electromagnetic input signal by the plurality of interferometers.

3. An apparatus as claimed in claim 1 wherein the sensor output signals control the interference of the electromagnetic input signal by the plurality of interferometers by controlling the coupling between two or more of the plurality of interferometers.

4. An apparatus as claimed in claim 1 wherein each of the plurality of sensors is configured to sense a different characteristic.

5. An apparatus as claimed in claim 1 wherein the electromagnetic input signal comprises a plurality of coherent components.

6. An apparatus as claimed in claim 5 wherein the output signal comprises a plurality of components and in the first output signal a first component has the largest power level and in the second output signal a second, different component has the largest power level.

7. An apparatus as claimed in claim 5 wherein the components of the electromagnetic input signal are selected so that the first output is provided when the plurality of different types of characteristics sensed by the sensors correspond to a first context and the second output is provided when the plurality of different types of characteristics sensed by the sensors correspond to a second context.

8. An apparatus as claimed in claim 1 wherein the electromagnetic input signal comprises radiation with a wavelength between 100 nm and 2500 nm.

9. An apparatus as claimed in claim 1 wherein the electromagnetic input signal is provided by a laser.

10. An apparatus as claimed in claim 1 wherein the apparatus is also configured to receive one or more control inputs where the control inputs control the interference of the electromagnetic input signal by at least some of the plurality of interferometers.

11. An apparatus as claimed in claim 10 wherein the control inputs are configured so that the first output is provided when the plurality of different types of characteristics sensed by the sensors correspond to a first context and the second output is provided when the plurality of different types of characteristics sensed by the sensors correspond to a second context.

12. An apparatus as claimed in claim 1 wherein the plurality of interferometers may be modelled as an N×N matrix, where N is the number of components in the electromagnetic input signal and where the values of the elements in the matrix are given by the interference of the electromagnetic input signal caused by the plurality of interferometers.

13. An apparatus as claimed in claim 12 wherein the values of the components of the electromagnetic input signal are selected to correspond to a combination of two different rows of the matrix.

14. A method comprising:
   configuring a plurality of interferometers to receive electromagnetic input signals and receive a plurality of sensor output signals from a plurality of sensors to enable the plurality of sensor output signals to be provided to the plurality of interferometers to control interference of the electromagnetic input signals by the plurality of interferometers, wherein different sensors within the plurality of sensors are configured to sense different types of characteristics such that the plurality of sensor output signals provide an indication of a plurality of different types of sensed characteristics, wherein the plurality of interferometers is provided on a single chip, and
   configuring the plurality of interferometers to provide a first output signal when the plurality of different types of characteristics sensed by the plurality of sensors correspond to a first context and a second output signal when the plurality of different types of characteristics sensed by the plurality of sensors correspond to a second context.

15. A method as claimed in claim 14 wherein configuring the interferometers to provide the first output signal and the second output signal comprises an iterative calibration procedure.

16. A method as claimed in claim 15 wherein the iterative calibration procedure comprises selecting a first output signal to correspond to a first context and selecting a second output signal to correspond to a second context and providing known inputs by the plurality of sensors and varying the components of the electromagnetic input signal to find an electromagnetic input signal which provides the selected outputs for the respective contexts.

17. A computer program product comprising a non-transitory computer-readable storage medium bearing computer program instructions for causing a computer to perform the method of claim 14.

18. A method as claimed in claim 14 wherein the plurality of interferometers comprise a plurality of phase shift elements configured to provide phase shifts in the electromagnetic input signal received by the interferometers, and the method comprises configuring the phase shift elements to receive the plurality of sensor output signals from the plurality of sensors to enable the plurality of phase shift elements to vary phase shifts in response to the sensor output signals to control the interference of the electromagnetic input signals by the plurality of interferometers.

19. A method as claimed in claim 14 wherein the sensor output signals control the interference of the electromagnetic input signal by the plurality of interferometers by controlling the coupling between two or more of the plurality of interferometers.

20. A computer program product comprising a non-transitory computer-readable storage medium bearing computer program instructions that, when executed by at least one processor, enable:
   configuring a plurality of interferometers that are arranged to receive electromagnetic input signals and to receive a plurality of sensor output signals from a plurality of sensors to enable the plurality of sensor output signals to be provided to the plurality of interferometers to control interference of the electromagnetic input signals by the plurality of interferometers, wherein different sensors within the plurality of sensors are configured to sense different types of characteristics such that the plurality of sensor output signals provide an indication of a plurality of different types of sensed characteristics, wherein the plurality of interferometers is provided on a single chip; and
   configuring the plurality of interferometers to provide a first output signal when the plurality of different types of characteristics sensed by the plurality of sensors correspond to a first context and a second output signal when the plurality of different types of characteristics sensed by the plurality of sensors correspond to a second context.

* * * * *